United States Patent
Muraoka et al.

(10) Patent No.: US 8,102,155 B2
(45) Date of Patent: Jan. 24, 2012

(54) DISCHARGE CONTROLLER

(75) Inventors: Yoshiyuki Muraoka, Osaka (JP); Haruya Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 12/441,687

(22) PCT Filed: Sep. 21, 2007

(86) PCT No.: PCT/JP2007/068406
§ 371 (c)(1),
(2), (4) Date: Mar. 17, 2009

(87) PCT Pub. No.: WO2008/044454
PCT Pub. Date: Apr. 17, 2008

(65) Prior Publication Data
US 2010/0045236 A1      Feb. 25, 2010

(30) Foreign Application Priority Data
Oct. 6, 2006   (JP) ................ 2006-274916

(51) Int. Cl.
*H02J 7/00*   (2006.01)
(52) U.S. Cl. .................................. 320/136
(58) Field of Classification Search .......... 320/136, 320/118
See application file for complete search history.

(56) References Cited

U.S. PATENT DOCUMENTS

| | | | | |
|---|---|---|---|---|
| 5,602,481 A | * | 2/1997 | Fukuyama | 324/434 |
| 5,929,603 A | * | 7/1999 | Nakao et al. | 320/136 |
| 6,163,131 A | * | 12/2000 | Gartstein et al. | 320/118 |
| 2005/0052157 A1 | | 3/2005 | Kinoshita et al. | |
| 2007/0120534 A1 | * | 5/2007 | Arai | 320/133 |

FOREIGN PATENT DOCUMENTS

| | | |
|---|---|---|
| JP | 10-257684 | 9/1989 |
| JP | 5-054275 | 3/1993 |
| JP | 8-126214 | 5/1996 |
| JP | 8-149707 | 6/1996 |
| JP | 11-008940 | 1/1999 |
| JP | 2001-307781 | 11/2001 |
| JP | 2005-085566 | 3/2005 |

* cited by examiner

*Primary Examiner* — M'Baye Diao
(74) *Attorney, Agent, or Firm* — McDermott Will & Emery LLP (57) ABSTRACT

A discharge controller includes a secondary battery, a switch section for opening/closing a discharge path from the secondary battery to a load, a voltage detector for detecting a terminal voltage of the secondary battery, and a cut-off voltage control section for controlling the switch section to be opened when the terminal voltage as detected by the voltage detector is not more than a predetermined cut-off voltage of discharge $V_E$, while measuring an amount of decrease per unit time of the terminal voltage as detected by the voltage detector to set the cut-off voltage of discharge $V_E$ to a lower voltage, for a larger amount of decrease per unit time of the terminal voltage as detected by the voltage detector.

7 Claims, 3 Drawing Sheets

DISCHARGE CONTROLLER

RELATED APPLICATIONS

This application is the U.S. National Phase under 35 U.S.C. §371 of International Application No. PCT/JP2007/068406, filed on Sep. 21, 2007, which in turn claims the benefit of Japanese Application No. 2006-274916, filed on Oct. 6, 2006, the disclosures of which Applications are incorporated by reference herein.

FIELD OF THE INVENTION

The present invention relates to a discharge controller adopting a nonaqueous-electrolyte secondary battery, for use in heavy load equipment, an electric vehicle or other transport aircraft machines which require large capacity and long life.

DESCRIPTION OF THE RELATED ART

In recent years, with developments of electronic technologies, heavy load equipments, or electric vehicle or other transport aircraft machines of smaller in size and lighter in weight have been developed. With this development, secondary batteries of higher energy density and longer life have been demanded. For the secondary batteries to be used in the above electronic equipments, nickel-cadmium battery, a nickel-hydrogen battery, a lead-acid battery, a lithium-ion secondary battery or the like is used as the secondary battery, and among those, a lithium-ion secondary battery have been used. Among them, the lithium-ion secondary battery is most suited to realize the equipments of smaller in size and lighter in weight.

When adopting such lithium-ion secondary battery; however, the following problem may arise. That is, when the terminal voltage becomes too low as a result of discharging, an irreversible chemical reaction may occur inside the battery, which causes drastic deteriorations of the battery performance. In order to avoid such problem, the lower limit voltage of discharge is set for a lithium-ion secondary battery by a manufacturer. Namely, the lower limit voltage of discharge can be defined as a lower tolerable limit voltage when discharging.

The usages of the foregoing secondary batteries include cyclic application and float application. In the general cyclic application, the secondary battery is first charged by the charger to the upper limit voltage, and the secondary battery is then connected to the load to be discharged to the lower limit voltage of discharge. On the other hand, in the general float application, the secondary battery is always connected to the charger and the load, and when the voltage of the secondary battery is not more than the upper limit voltage, the charge is performed continuously while performing discharge as necessary.

Generally, the secondary batteries have such characteristic that their capacities for discharging become smaller while repeating the charge/discharge cycle. Such reduction in capacity is called cycle deterioration, which is the problem associated with the life of the secondary battery. One of the causes for the deterioration of the secondary battery can be a discharge of a terminal voltage to or below the lower limit discharge voltage, which in turn causes a deterioration of the positive electrode or the negative electrode material in the last stage of discharge.

The battery voltage ($V_{cell}$) is determined by the potential difference between the positive electrode potential ($V_p$) and the negative electrode potential ($V_n$), and is expressed as $V_{cell}=V_p-V_n$. There are two cases according to the structure of the secondary battery, i.e., the case where the cell voltage ($V_{cell}$) reaches the cut-off voltage of discharge due to a decrease in electrical potential ($V_p$) of the positive electrode, and the case where the cell voltage ($V_{cell}$) reaches the cut-off voltage of discharge due to an increase in electrical potential ($V_n$) of the negative electrode.

It is generally known that the respective potentials at which the positive electrode and the negative electrode start deteriorating when terminating the discharge are 1.5 V or below (with respect to lithium potential) for the positive electrode potential ($V_p$), and 2.5 V or above (with respect to lithium potential) for the negative electrode potential ($V_n$).

When adopting for the positive electrode, an active material having a α-NaFeO$_2$ type layer evaporitic structure represented by cobaltic acid, an irreversible reaction would start at a potential of not higher than 1.5 V with respect to lithium potential, which would result in cycle deterioration of the positive electrode.

On the other hand, when adopting for the negative electrode, the generally used copper foil as current collector, the copper would melt at a potential of not less than 2.0 V (with respect to lithium potential). Further, when charging once again the battery that reaches the melting potential of the copper, a small short-circuit and an increase in resistance of the cell would occur due to the copper deposited to the positive electrode side, resulting in a rapid cycle deterioration. It is therefore necessary to stop the discharge in the state where the potential of the positive and negative electrodes falls in the above potential range to prevent an occurrence of a rapid cycle deterioration.

When current when discharging is increased, the polarizations of both the positive electrode and the negative electrode increase. Namely, the potential ($V_p$) of the positive electrode is reduced, while increasing the potential ($V_n$) of the negative electrode. Here, when terminating the discharge as a result of decreasing the positive electrode potential, the cut-off voltage of discharge $V_{cell}1$ when discharging with a current I1 is expressed as: $V_{cell}1=V_p1-V_n1$, wherein $V_p1$ indicates the positive electrode potential, and $V_n1$ indicates the negative electrode potential when discharging with a current of I1). This expression gives $V_p1=V_{cell}1-V_n1$.

Next, the cut-off voltage of discharge $V_{cell}1$ when discharging with a current of I2 which is larger than the current I1 can be expressed as: $V_{cell}1=V_p1-V_n1+\alpha$ ($\alpha$ indicates a polarization with an increase in current, $V_p2$ indicates the positive electrode potential, and $V_n1+\alpha$ indicates the negative electrode potential when discharging with the current I2). This expression gives $V_p2=V_{cell}1+V_n1+\alpha$.

Therefore, even when the cut-off voltage of discharge is reduced by an amount corresponding to an increase in negative electrode potential a due to an increase in current from the current value I1 to the current value I2, the positive electrode potential would not be changed between the case of discharging with a current value I1 when terminating the discharge and the case of discharging with a current value I2. It is therefore possible to set a lower limit voltage of discharge to a low voltage with an increase in discharge current.

On the other hand, in the case of terminating the discharge resulting from a decrease in potential of the negative electrode, the positive polarity and the negative electrode are in opposite polarities. It is therefore possible to reduce the lower limit voltage of discharge with an increase in discharge current as in the case of terminating the discharge by a reduction in positive electrode potential.

Figure 3:
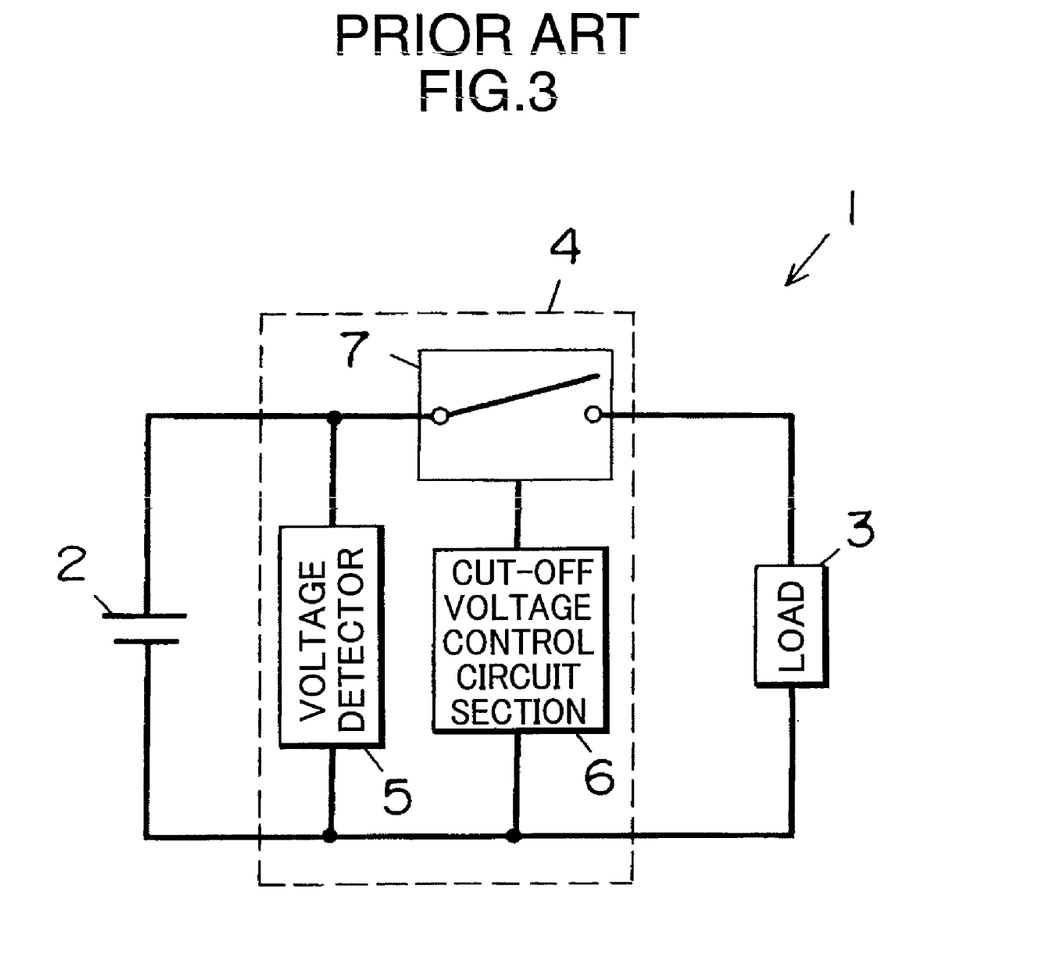
FIG. 3 is a block diagram showing the structure of conventional discharge controller.

FIG. 3 is a block diagram showing operations of conventional discharge controller. The discharge controller 1 includes a secondary battery 2, a load 3, and a controller 4 which are connected as shown in FIG. 3. It should be noted here that the load 3 can be disconnected while discharge is not performed. The secondary battery 2 is a chargeable/dischargeable battery, and is connected to the controller 4. The load 3 consumes power. The load 3 can be, for example, a heavy load equipment, such as a power tool, a motor, etc., which consumes power.

The controller 4 includes a voltage detector 5, a cut-off voltage control circuit section 6, and an on/off switch 7. The voltage detector 5 detects a voltage value $V_b$ of the secondary battery 2. The end voltage control circuit section 6 sets the cut-off voltage of discharge $V_E$. The cut-off voltage control circuit section 6 compares the voltage $V_b$ of the secondary battery 2 detected by the voltage detector 5 with the cut-off voltage of discharge $V_E$. Furthermore, the cut-off voltage control circuit section 6 controls ON/OFF of the on/off switch 7 as necessary based on a result of comparison to connect or disconnect the secondary battery 2 to or from the load 3 via the on/off switch 7. The cut-off voltage control circuit section 6 sets the cut-off voltage of discharge $V_E$, and outputs the cut-off voltage of discharge $V_E$ as set. The cut-off voltage control circuit section 6 can be realized, for example, using a microcomputer.

When adopting the foregoing structure of the control section 4, generally adopted is the control method wherein when $V_E > V_b$, the discharge is terminated.

However, when adopting the foregoing method of controlling the cut-off voltage of discharge, in the case where the discharge current value is increased, the cell voltage may reach the lower limit value as set due to the generation of polarity, despite of that the respective potentials of the positive electrode and the negative electrode have not reached the potentials at which the positive electrode and the negative electrode deteriorate. For this reason, an amount of energy which can be used with an increase in discharge current becomes smaller.

As a solution to the foregoing problems, Patent Document 1 discloses the structure wherein the cut-off voltage of discharge varies according to a current value.

However, when adopting the means for varying the cut-off voltage of discharge according to the discharge current as disclosed in Patent Document 1, it is not possible to terminate the discharge at an optimal voltage, and a rapid cyclic deterioration occurred or the battery capacity of sufficient level could not be achieved depending on environmental temperature. This is because, for some temperatures, both excellent cycle performances and battery capacity could be obtained when varying the cut-off voltage of discharge according to the discharge current value. However, depending on differences in cell temperature due to differences in environmental use temperature or use conditions of the discharge controller, the respective polarities of the positive electrode and the negative electrode greatly vary. When changing the cut-off voltage of discharge only based on the discharge current value, a problem arises in that the discharge is terminated before discharging the charges to a sufficient level, or rapid cycle deterioration occurs due to over-discharge.

Patent Document 1: Japanese Patent Laid-Open Publication No. 10-257684

SUMMARY OF THE INVENTION

It is an object of the present invention to provide a discharge controller which offers an improved utilization efficiency of energy as stored with ease by suppressing a drop in lower limit voltage of discharge while suppressing deterioration in cycle deterioration in performances of a secondary battery.

A discharge controller according to one aspect of the present invention includes a secondary battery, a switch section for opening and closing a discharge path from the secondary battery to a load, a voltage detector for detecting a terminal voltage of the secondary battery, and a cut-off voltage control section for controlling the switch section to be opened when the terminal voltage as detected by the voltage detector is at or below a predetermined cut-off voltage of discharge $V_E$, and while measuring an amount of decrease per unit time of the terminal voltage as detected by the voltage detector to set the cut-off voltage of discharge $V_E$ to a lower voltage, for a larger amount of decrease per unit time of the terminal voltage as detected by the voltage detector.

According to the foregoing structure, the discharge of the secondary battery is stopped when the terminal voltage of the secondary battery is reduced to not more than the cut-off voltage of discharge $V_E$. Moreover, when the cut-off voltage of discharge $V_E$ is set by the cut-off voltage control section such that the large is the amount of decrease per unit time, the lower is the cut-off voltage of discharge $V_E$. With this structure, in the case where respective polarizations of the positive and negative electrodes increase as a result of discharging the secondary battery with a large current, an amount of decrease per unit time increases. As a result, the cut-off voltage control section reduces the cut-off voltage of discharge $V_E$ corresponding to an increase in polarizations of the positive and negative polarities. It is therefore possible to improve the utilization efficiency of energy as stored by reducing the cut-off voltage of discharge $V_E$ while suppressing the cycle deterioration of the secondary battery.

In the case where the polarizations of positive and negative electrodes are reduced as a result of discharging the secondary battery with a low current, an amount of decrease in voltage per unit time is reduced. As a result, the cut-off voltage control section increases the cut-off voltage of discharge $V_E$ corresponding to a decrease in polarizations of the positive and negative polarities. It is therefore possible to suppress the deterioration of the secondary battery by terminating the discharge before the deterioration in the cycle performance occurs without being affected by an increase in voltage resulting from the deterioration in cycle performances caused by a decrease in polarizations of the positive and negative polarities.

Furthermore, the polarization of the positive and negative electrodes may vary according to environmental temperatures. However, even if the variations in polarization occur, by assuming the polarization of the positive and negative electrodes based on an amount of decrease per unit time of the terminal voltage of the secondary battery, it is possible to set the cut-off voltage of discharge $V_E$ reflecting the changes in polarization of the positive and negative polarities according to changes in environmental temperature. As a result, the problem associated with the conventional structure wherein the cut-off voltage of discharge $V_E$ is set based on a discharge current value is less likely to occur, i.e., an appropriate cut-off voltage of discharge cannot be obtained according to an environmental temperature.

BEST MODE FOR CARRYING OUT THE INVENTION

First Embodiment

Figure 1:
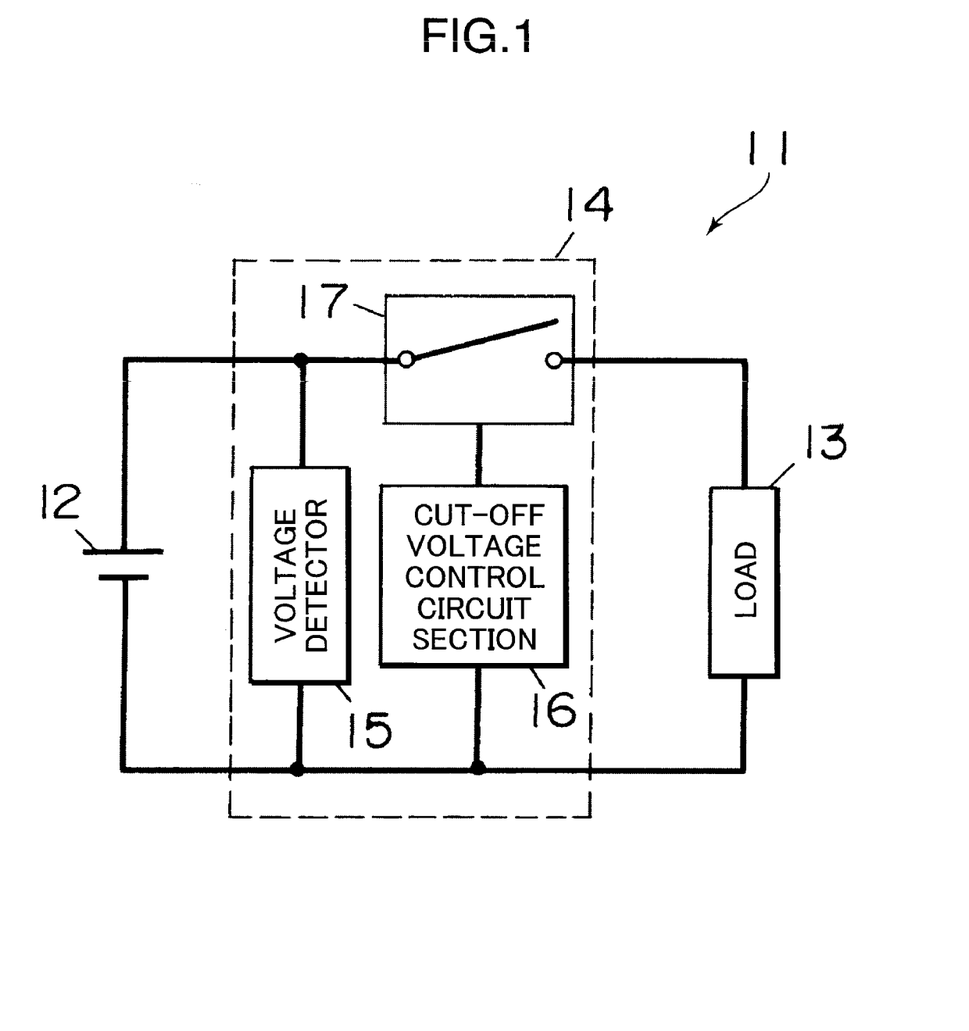
FIG. 1 is a block diagram showing one example structure of charge/discharge controller in accordance with the first embodiment of the present invention.

The following descriptions explain the first embodiment with reference to FIG. 1. A discharge controller in accordance with the first embodiment of the present invention includes a secondary battery 12, a load 13, and a controller 14 which are connected as shown in FIG. 1. It should be noted here that the load 13 can be disconnected while discharge is not performed. The discharge controller shown in FIG. 1 is suited in applications wherein discharge is performed using a large discharge current of a wide range, in the case of, for example, adopting a heavy load equipment as a load 13, such as a power tool, an electric scooter, assistance bicycle, or the like.

The secondary battery 12 is a lithium-ion secondary battery using the nonaqueous-electrolyte. The secondary battery 12 may be arranged such that a plurality of cells are connected in series or in parallel, are connected in series and parallel. Incidentally, the number of batteries (cells) to be connected is not particularly limited. To a control unit 14 of the discharge controller 11, connected is the secondary battery 12. To the control unit 14, also connected is the load 13.

Incidentally, the secondary battery 12 is regulated with a positive electrode capacity such that the discharge is stopped by a decrease in potential of the positive electrode at the end of discharge.

The controller 14 includes a voltage detector 15 (voltage detecting section), a cut-off voltage control circuit section 16 (cut-off voltage control section), and an on/off switch 17 (switch section).

To the control unit 14, connected is the voltage detector 15 for detecting a voltage across the terminals of the secondary battery 12. To the secondary battery 12, connected via the on/off switch 17 is the load 13. With this structure, a power of predetermined level is supplied from the secondary battery 12 to the load 13 via the on/off switch 17. The voltage as detected by the voltage detector 15 is inputted to the cut-off voltage control circuit section 16.

The cut-off voltage control circuit section 16 can be realized, for example, using a microcomputer. This cut-off voltage control circuit section 16 instructs the on/off switch 17 to be opened when the discharge voltage Vb of the secondary battery 12 detected by the voltage detector 15 (the terminal voltage of the secondary battery 12 at discharge) decreases to the cut-off voltage of discharge $V_E$ set by the cut-off voltage control circuit section 16, thereby terminating a discharge operation.

Figure 2:
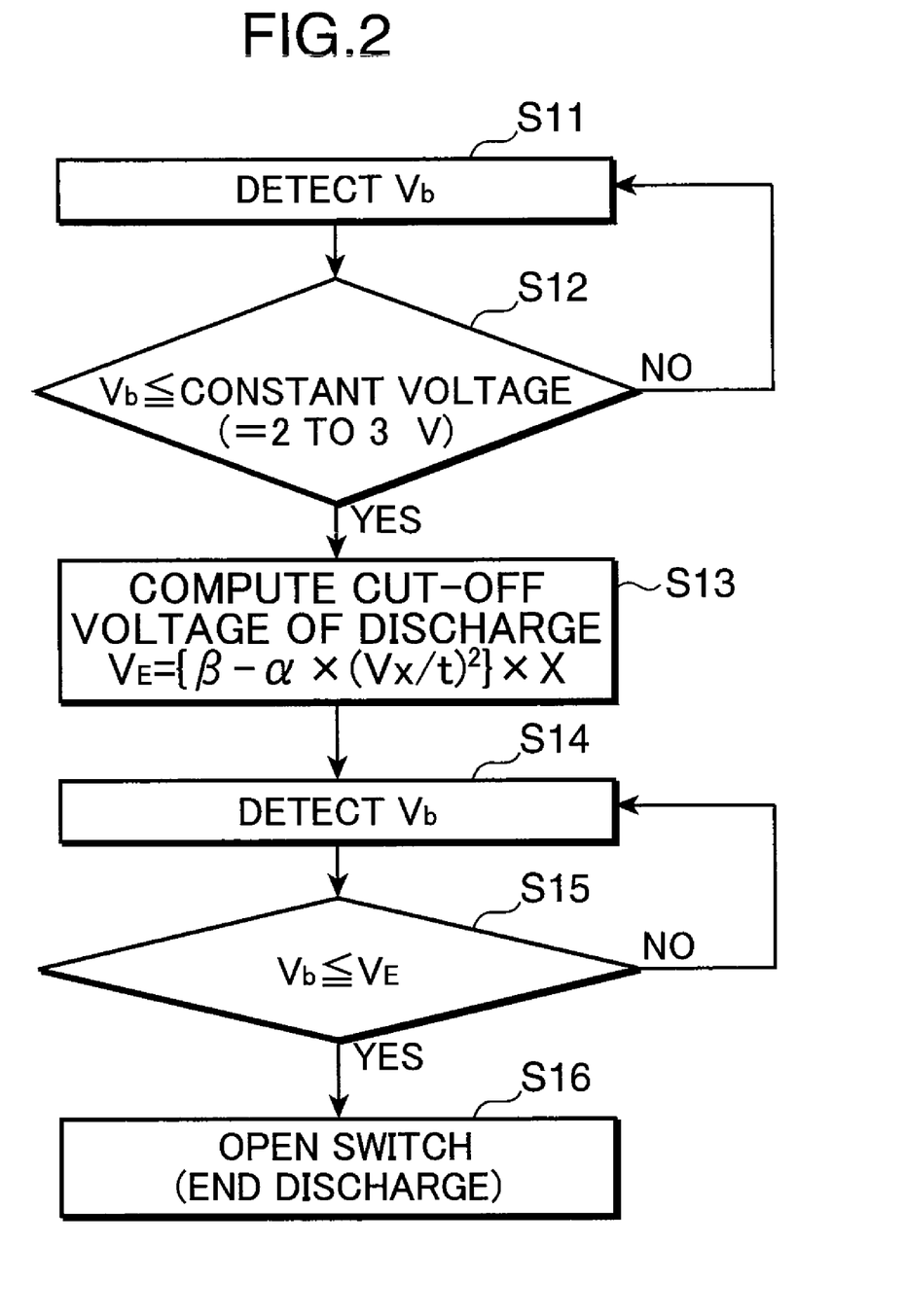
FIG. 2 is a flowchart showing example operations of the charge/discharge controller of FIG. 1.

FIG. 2 is a flowchart showing operations of the charge/discharge controller of FIG. 1 as one example. As shown in FIG. 2, when the discharge voltage $V_b$ of the secondary battery 12 is detected by the voltage detector 15, the discharge voltage $V_b$ as detected is inputted to the cut-off voltage control circuit section 16 (S11). Next, the cut-off voltage control circuit section 16 determines if the discharge voltage $V_b$ as inputted is equal to or smaller than the constant voltage $V_a$ (threshold voltage) (S12). The constant voltage $V_a$ may be set, for example, in a range of from 2V to 3V.

The cut-off voltage control circuit section 16 continuously detects the discharge voltage $V_b$ when the discharge voltage $V_b$ is larger than the constant voltage $V_a$ (NO in S12). On the other hand, when the cut-off voltage control circuit section 16 determines that the discharge voltage $V_b$ becomes not higher than the constant voltage $V_a$ (YES in S12), the cut-off voltage control circuit section 16 performs a computation of the cut-off voltage of discharge $V_E$ (S13). The computation method of the cut-off voltage of discharge $V_E$ will be explained later.

Furthermore, the cut-off voltage control circuit section 16 determines if the discharge voltage $V_b$ as inputted from the voltage detector 15 in S14 is smaller than the cut-off voltage of discharge $V_E$ (S15). The cut-off voltage control circuit section 16 continuously detects the discharge voltage $V_b$ when the discharge voltage $V_b$ is larger than the cut-off voltage of discharge $V_E$ (NO in S15). On the other hand, when the cut-off voltage control circuit section 16 determines that the discharge voltage $V_b$ becomes equal to or smaller than the cut-off voltage of discharge $V_E$ (YES in S15), the cut-off voltage control circuit section 16 instructs the on/off switch 17 to be opened, thereby terminating the discharge operation (S16).

After carrying out the foregoing steps, the operations of controlling the discharge by the discharge control in accordance with the first embodiment are terminated.

In the case of terminating the discharge of the secondary battery 12 when the terminal voltage of the secondary battery 12 is decreased to the given cut-off voltage of discharge, if the cut-off voltage of discharge is set to a voltage directly before the voltage at which the material of the secondary battery 12 starts deteriorating, and a rapid cycle deterioration occurs by discharging the secondary battery 12 at low voltage, the following problem would arise. That is, when discharging the secondary battery 12 with a large current, the polarization of the positive and negative electrodes becomes large, and despite that the potential of the positive and negative electrodes has not reached the potential at which respective materials start deteriorating, the terminal voltage of the secondary battery 12 would be reduced to the given cut-off voltage of discharge, thereby terminating the discharge. In this case, the discharge is terminated with dischargeable charges remaining in the secondary battery 12, and a sufficient capacity of the battery cannot be obtained.

On the other hand, if the cut-off voltage of discharge is set to a voltage directly before the voltage at which the material of the secondary battery 12 starts deteriorating, and a rapid cycle deterioration occurs by discharging the secondary battery 12 with a large current, the following problem would arise. That is, when discharging the secondary battery 12 with a small current, the discharge would be stopped only after the polarizations of the positive and negative electrodes reach the potential at which respective materials start deteriorating, which would result in a rapid cycle deterioration.

Incidentally, in the case of adjusting the voltage at which the discharge of the secondary battery is terminated according to the discharge current value, by adjusting the cut-off voltage of discharge so as to set the terminal voltage of the secondary battery to a voltage directly before a voltage at which the cycle deterioration occurs for each current value, it is possible to realize an excellent cycle performance while ensuring a sufficient discharge capacity.

However, the terminal voltage of the secondary battery directly before the cycle deterioration occurs is greatly influenced by changes in an environmental temperature. For instance, when the secondary battery is discharged under the environment temperature above 20° C., the polarizations of the positive and negative electrodes at discharge become smaller than that when discharging the secondary battery under the environment temperature below 20° C. Therefore, when terminating the discharge by means of the discharge control device which is optimized at 20° C., by adjusting the cut-off voltage of discharge in consideration of the polarization which would occur according to a discharge current value, when the secondary battery is discharged at above 20° C., the potential of the positive and negative electrodes at discharge becomes smaller than that when discharging the secondary battery below 20° C. Therefore, in the case of discharging with a large current, the potential of the positive and negative electrodes may already reach the potential at which the material deteriorates when terminating the discharge. As a result, the rapid cycle deterioration of the secondary battery may occur.

When the secondary battery 12 is discharged at temperature below 20° C. with a large current, the polarizations of the positive and negative electrodes at discharge become large. Therefore, the terminal voltage of the secondary battery would reach the cut-off voltage of discharge with dischargeable charges still remaining in the secondary battery 12, and a sufficient capacity of the battery cannot be obtained. As a result, the discharge of the secondary battery would be terminated before discharging the secondary battery to a sufficient level and it is therefore not possible to obtain a sufficient battery capacity.

In response, the cut-off voltage control circuit section 16 computes the cut-off voltage of discharge $V_E$ and sets the cut-off voltage of discharge $V_E$ as computed in S13 using the following formula (A) based on a change in voltage $V_X$, measurement time t, the number of lines in series, a constant $\alpha$ ($5.0 \leq \alpha \leq 25$), a constant $\beta$ ($1.5 \leq \beta \leq 3.0$).

$$V_E = \{\beta - \alpha \times (V_x/t)^2\} \times X \quad (A).$$

Here, the number of lines in series X indicates the number of lines in series of cells which constitute the secondary battery 12.

In the case of the secondary battery 12 made up of a cell, "×X" in the above formula (A) is not needed.

The measurement time t indicates the time required for measuring an amount of reduction per unit time of the terminal voltage of the secondary battery 12.

An amount of change in voltage $V_X$ indicates a reduced amount of the terminal voltage of the secondary battery 12 in the measurement time t as detected by the voltage detector 15.

It is preferable that the measurement time t be set to such period that an amount of change in voltage $V_X$ in a range of from 0.1 V to 0.8 V can be obtained. Although such measurement time t varies according to the characteristics of the secondary battery 12, such as the discharge current value, the battery capacity, etc., it is generally preferable that the measurement time t be set in a range of from 0.1 sec to 5 sec.

A value for the constant $\alpha$ varies according to a cell design. Specifically, it is preferable that the constant $\alpha$ be small for a high output cell with small variations in voltage. On the other hand, it is preferable that the constant $\alpha$ be large for a low output cell with large variations in voltage. The constant $\beta$ is a value that changes according to the material due to a difference in decomposition voltage for respective materials. In addition, the respective values for these constant $\alpha$ and constant $\beta$ were experimentally obtained as a result of earnest researches made by the inventors of the present invention.

The cut-off voltage control circuit section 16 calculates the cut-off voltage of discharge $V_E$, for example, from the above expression (A), and sets the cut-off voltage of discharge $V_E$ based on a value obtained by dividing the amount of change in voltage $V_X$ by the measurement time t. As a result, the cut-off voltage control circuit section 16 sets the cut-off voltage of discharge $V_E$ to the terminal voltage directly before the cycle deterioration of the secondary battery occurs.

Here, the terminal voltage directly before the cycle deterioration of the secondary battery occurs is liable to change according to the polarization of the positive and negative electrodes at discharge. It is therefore not easy to set the cut-off voltage of discharge $V_E$ to the terminal voltage directly before the cycle deterioration of the secondary battery occurs. However, the inventors of the present invention experimentally found that the terminal voltage of the secondary battery directly before the cyclic degradation occurs could be assumed based on a value obtained by dividing the amount of change in voltage $V_X$ by the measurement time t.

By calculating the cut-off voltage of discharge $V_E$ form the above expression (A), in the case of discharging the secondary battery 12 with a large current, the value obtained by dividing the amount of change in voltage $V_X$ by the measurement time t, i.e., the terminal voltage of the secondary battery 12 per unit time increases, and it is therefore possible for the cut-off voltage control circuit section 16 to decrease the cut-off voltage of discharge $V_E$ by a value corresponding to an increase in polarization of the positive and negative electrodes. When the cut-off voltage of discharge $V_E$ is deceased by a value corresponding to an increase in polarization of the positive and negative electrodes, it is possible to discharge the secondary battery 12 to a sufficient level by continuing the discharge of the secondary battery 12 to the point directly before the cycle deterioration occurs to reduce the dischargeable charges still remaining in the secondary battery 12. As a result, a sufficient battery capacity can be obtained.

By computing the cut-off voltage of discharge $V_E$ form the above expression (A), in the case of discharging the secondary battery 12 with a small current, the value obtained by dividing the amount of change in voltage $V_X$ by the measurement time t, i.e., the terminal voltage of the secondary battery 12 per unit time decreases, and it is therefore possible for the cut-off voltage control circuit section 16 to increase the cut-off voltage of discharge $V_E$ by a value corresponding to a decrease in polarization of the positive and negative electrodes. When the cut-off voltage of discharge $V_E$ is increased by a value corresponding to a decrease in polarization of the positive and negative electrodes, it is possible to stop the discharge of the secondary battery 12 directly before the cycle deterioration occurs. As a result, it is possible to suppress a rapid cycle deterioration of the secondary battery 12 caused by a deterioration of the material of the secondary battery 12.

Moreover, it is less likely to be affected by a change in an environmental temperature if occurs. Namely, by assuming the polarization of the positive and negative electrodes based on a value obtained by dividing the amount of change in voltage Vx by the measurement time t (an amount of decrease per unit time of the terminal voltage of the secondary battery 12), even when the polarization of the positive and negative electrodes changes due to a change in environmental temperature, it is possible to determine the cut-off voltage of discharge $V_E$ by reflecting a change in the polarization of the positive and negative electrodes according to the change in environmental temperature. As a result, an excellent cyclic performance can be realized by controlling the cut-off voltage of discharge as described above while ensuring a sufficient discharge capacity.

The inventors of the present invention experimentally found that by controlling the cut-off voltage of the discharge $V_E$ based on the above expression, a high capacity would be ensured while suppressing the cycle deterioration to the minimum. Incidentally, it can be assumed that the foregoing effect can be achieved by terminating the discharge directly before the material starts deteriorating with high precision.

Further, as shown in S12, the cut-off voltage control circuit section 16 measures an amount of decrease in voltage per unit time when the terminal voltage of the secondary battery 12 detected by the voltage detector 15 becomes lower than the predetermined threshold voltage within the range of 3.0 V to 2.0 V. Namely, the cut-off voltage control circuit section 16 starts a measurement of a change in amount of voltage $V_X$ from the point the cell voltage reaches from 3.0 V to 2.0 V per cell.

When adopting for the positive electrode, an active material having a $\alpha$-$NaFeO_2$ type layer evaporitic structure represented by cobaltic acid, an irreversible reaction would start at a potential of not higher than 1.5 V with respect to lithium potential, which would result in cycle deterioration of the positive electrode.

On the other hand, when adopting for the negative electrode, the generally used copper foil as a current collector, the copper would melt at a potential of not higher than 2.0 V with respect to lithium potential. Further, when charging once again the battery that reaches the melting potential of the copper, a small short-circuit and an increase in resistance of the cell would occur due to the copper deposited to the positive electrode side, thereby causing a rapid cycle deterioration.

Namely, a rapid cyclic degradation occurs if the discharge is not terminated in the state where the potential of the positive electrode or the negative electrode is in the above-mentioned potential range. It is therefore necessary to set the cut-off voltage of discharge to or above the cell voltage at which respective materials start deteriorating.

Here, as the discharge current of the secondary battery decreases, the positive electrode potential becomes lower and the negative electrode potential becomes higher in the case of terminating the discharge at the same voltage. Additionally, the smaller is the discharge current, the discharge needs to be stopped at higher terminal voltage. It is necessary to set the discharge end voltage of discharge $V_E$ before the terminal voltage of the secondary battery has decreased to the cut-off voltage of discharge $V_E$ as a result of discharge.

It is therefore necessary for the cut-off voltage control circuit section 16 to determine the cut-off voltage of discharge $V_E$ while the terminal voltage of the secondary battery is at or above the cut-off voltage of discharge $V_E$ in the case of discharging the secondary battery with a constant current.

In response, the inventors of the present invention experimentally found that a rapid cyclic degradation would be suppressed by terminating the discharge when the cell voltage is at or above 1.5 V. It was also clarified by the research that it would be preferable to measure an amount of change in voltage $V_X$ by the controller in a range of from 3.0 V to 2.0 V to determine the cut-off voltage of discharge in consideration of the time loss and variations in voltage.

As for the lithium-ion secondary battery, the amount of decrease in the terminal voltage resulting from the discharge is small in the area where the terminal voltage is above 3.0 V. For this reason, when an amount of change in voltage $V_X$ is detected in the area where the terminal voltage for each series cell of the secondary battery 12 exceeds 3.0 V, the amount of change in voltage $V_X$ as detected would be small. As a result, the precision in computing the cut-off voltage of discharge $V_E$ from the expression (A) is lowered, which in turn makes it impossible to improve the cycle performances and increase the capacity to sufficient levels.

On the other hand, in the area where the terminal voltage for each series cell of the secondary battery 12 is below 2.0 V, the terminal voltage drastically drops as a result of discharge. For this reason, when the amount of change in voltage $V_X$ is detected in the area where the terminal voltage for each series cell of the secondary battery 12 is below 2.0 V, the amount of change in voltage $V_X$ as detected would be too large. As a result, immediately after detecting the amount of change in voltage $V_X$, the cell voltage would reach the potential at which the material starts deteriorating. It is therefore not preferable to detect the amount of change in voltage $V_X$ in such area, as sufficient cycle performances cannot be obtained.

Here, it is preferable that the secondary battery 12 is regulated with a positive electrode capacity such that the discharge is stopped by a decrease in potential of the positive electrode at the end of discharge for the following reason.

That is, in the case of regulating the secondary battery with a negative electrode capacity, it would be difficult to detect a change in voltage since the cell voltage changes only gradually.

The following will provide examples for the nonaqueous-electrolyte secondary battery the discharge controller adopting the same as a power supply in accordance with the present invention.

Example 1

The following will provide examples for the nonaqueous-electrolyte secondary battery and the discharge controller adopting the same as a power supply in accordance with one embodiment of the present invention.

After baking $Li_2CO_3$, $CO_3O_4$, NiO, and $MnO_2$, these materials were mixed to have a composition of $LiNi_{0.33}Mn_{0.33}Co_{0.33}O_2$. The resulting composition $LiNi_{0.33}Mn_{0.33}Co_{0.33}O_2$ was then baked for ten hours at 900° C. to obtain a positive electrode active material. 100 parts by weight of the resulting positive electrode active material were kneaded with 2.5 parts by weight of the acetylene black, 4 parts by weight of the fluoroplastics binder, and an appropriate amount of carboxymethylcellulose solution using the Double Arm Kneader, thereby producing positive electrode paste.

The resulting positive electrode paste was then applied onto both surfaces of the aluminum foil with a thickness of 30 μm and then dried. The positive electrode paste was then rolled to have a thickness of 99 μm, a theoretical capacity unit per area of 3.7 mAh, and a porosity of a composite material of 25%. The resulting positive electrode paste was then cut into pieces with a size of 52 mm in width and 1660 mm in length, thereby obtaining positive electrode plates.

On the other hand, the mesophase-based graphite heated at a temperature of 2800° C. (hereinafter referred to as the mesophase graphite) was used as an active material for the negative electrode. 100 parts by weight of this active material is stirred with 2.5 parts by weight of modified form of acrylic acid (BM-400B (trade name) available from JAPAN ZEON CORPORATION with a solid content of 40% by weight), 1 part by weight of carboxymethyl cellulose, and an appropriate amount of water using the Double Arm Kneader, thereby producing negative electrode paste. The resulting negative electrode paste was then applied onto both surfaces of the aluminum foil with a thickness of 0.02 mm and then dried. The negative electrode paste was then rolled to have a thickness of 97 μm, and a porosity of a composite material of 35%. The resulting negative electrode paste was then cut into pieces with a size of 57 mm in width and 1770 mm in length, thereby obtaining negative positive electrode plates.

With a combination of the above positive electrode and the negative electrode, the negative electrode capacity of the negative electrode at a discharge voltage of 4.2 V was set to 250 mAh/g, and was formed into a battery regulated with the capacity of the positive electrode.

At around the center in the lengthwise direction of the positive electrode plate, the aluminum foil without having the positive electrode paste applied thereto is exposed with a width of 2.5 mm. On the other hand, on both sides of the negative electrode in the lengthwise direction, the aluminum foil without having the negative electrode paste applied thereto is exposed with a width of 2.5 mm. The aluminum lead with a size of 10 mm in width and 0.1 mm in thickness is welded in the positive electrode aluminum foil. On the other hand, the copper lead with a copper lead width of 3.0 mm was welded respectively in two parts (sides) of the negative electrode copper foil part.

Next, the foregoing positive electrode plate and the negative electrode plate are wound around like the eddy via the separator made of polyethylene with a size of 59 mm in width and a thickness of 20 μm, thereby preparing an electrode group. The resulting electrode group was then stored in a battery case with a size of 26.0 mm in diameter and a height of 65 mm. Next, the seal entrance board was welded in the positive electrode aluminum lead of the electrode group, and two negative electrode leads were welded with the case bottom. Thereafter, to a mixed solution of carbonic acid ethylene, carbonic acid methylic ethyl, and the carbonic acid dimethyl (with a volume ratio of 15:15:70), 13 g of nonaqueous-electrolyte dissolved therein 1.40M $LiPF_6$ was injected, and the battery case was then sealed. As a result, a cylindrical lithium-ion secondary battery with a nominal capacity of 2.6 Ah and an internal resistance of 19 mΩ was prepared.

Four lithium-ion secondary batteries thus prepared are connected in series as assembled cells, and are connected as the secondary battery 12 to the discharge controller shown in FIG. 1. According to the processes shown in the flowchart of FIG. 2, the discharge controller was operated, to detect the discharge capacity and the cut-off voltage of discharge. Here, the discharge controller was arranged so as to calculate the cut-off voltage of discharge from the following expression (B).

$$V_E = \{\beta - \alpha \times (V_X/t)^2\} \times 4 \quad (B)$$

In the above expression (B), $\alpha=15$, $\beta=2.5$, and $t=0.5$ sec.

Comparative Example 1

The assembled cells prepared by connecting four lithium-ion secondary batteries prepared in Example 1 were charged to 4.2 V beforehand with a current of 10 A. The assembled cells were connected as the secondary battery 2 to the discharge controller shown in FIG. 3, and the discharge was terminated at a voltage of 10 V.

Comparative Example 2

The assembled cells prepared by connecting four lithium-ion secondary batteries prepared in Example 1 were charged to 4.2 V beforehand with a current of 10 A. The assembled cells were connected as the secondary battery 2 to the conventional discharge controller shown in FIG. 3, and the discharge was terminated at a voltage of 6 V.

TABLE 1

|  | EXAMPLE 1 | | COMPARATIVE EXAMPLE 1 | | COMPARATIVE EXAMPLE 2 | |
| --- | --- | --- | --- | --- | --- | --- |
|  | Capacity (mAh) | Cut-off Voltage of Discharge (V) | Capacity (mAh) | Cut-off Voltage of Discharge (V) | Capacity (mAh) | Cut-off Voltage of Discharge (V) |
| 10A DISCHARGE | 2650 | 9.9 | 2650 | 10 | 2700 | 6 |
| 20A DISCHARGE | 2680 | 9.4 | 2630 | 10 | 2720 | 6 |
| 30A DISCHARGE | 2700 | 8.7 | 2600 | 10 | 2740 | 6 |
| 40A DISCHARGE | 2680 | 7.6 | 2580 | 10 | 2700 | 6 |
| 50A DISCHARGE | 2650 | 6.8 | 2500 | 10 | 2670 | 6 |
| 60A DISCHARGE | 2600 | 6 | 2560 | 10 | 2600 | 6 |

Using the discharge controllers of Example 1 and Comparative Examples 1 and 2, discharge capacities and cut-off voltages of discharge were detected at discharge currents of 10 A, 20 A, 30 A, 40 A, 50 A and 60 A respectively. The environmental temperature was set to 20° C. The results of the experiments are shown in Table 1.

As can be seen from Table 1, according to Example 1 of the present invention, even when the discharge current is increased, the discharge capacity of the battery is larger than that in the conventional structure of Comparative Example 1. The foregoing effect can be achieved by setting the cut-off voltage of discharge $V_E$ according to an amount of decrease in terminal voltage of the secondary battery 12 per unit time, which in turn makes it possible to change the cut-off voltage of discharge $V_E$ according to a discharge current, resulting in a decrease in discharge capacity.

TABLE 2

|  | DISCHARGE CAPACITY MAINTENANCE RATIO (%) | | |
| --- | --- | --- | --- |
|  | EXAMPLE 1 | COMPARATIVE EXAMPLE 1 | COMPARATIVE EXAMPLE 2 |
| 10A DISCHARGE | 80 | 80 | 60 |
| 20A DISCHARGE | 82 | 82 | 75 |
| 30A DISCHARGE | 75 | 75 | 72 |
| 40A DISCHARGE | 70 | 70 | 68 |
| 50A DISCHARGE | 65 | 65 | 62 |
| 60A DISCHARGE | 50 | 50 | 50 |

Using the discharge controllers of Example 1 and Comparative Example 1 respectively, the following cycle was repeated. That is, the assembled cells were charged to 4.2 V with a constant current of 10 A. The assembled cells were then left for 30 minutes. After 30 minutes, respective assembled sells were discharged respectively with discharge currents of 10 A, 20 A, 30 A, 40 A and 60 A. The assembled cells were then left again for 30 minutes. The foregoing steps of one cycle were repeated. The discharge capacity maintenance ratio after repeating the foregoing cycle 500 times (capacity after 500 cycles/initial capacity %) are shown in Table 2. The environmental temperature was set to 20° C.

As can be seen from Table 2, according to Example 1 of the present invention, in the case of increasing the discharge current, the value obtained by dividing the amount of change in voltage $V_X$ by the measurement time t increases. As a result, despite of a decrease in the cut-off voltage of discharge $V_E$ according to the expression (B), the cycle deterioration (reduction in the maintenance ratio of discharge capacity) was not observed as compared from the case of comparative example 1 (the cut-off voltage of discharge was set to 10 V) for the following reason as shown in Table 1. That is, with an increase in discharge current, the polarization increases, and this in turn increases the potential of the negative electrode. Consequently, the potential of the positive electrode does not reach the decomposition potential of the positive electrode. In contrast, according to comparative example 2, since the cut-off voltage of discharge is set to low, i.e., 6V, the cycle deterioration when discharging with low currents of 10 A and 20 A were large.

As described, according to example 1 of the present invention, it was possible to improve the utilization efficiency of energy as stored by reducing the cut-off voltage of discharge than that in the case of comparative example 1 while maintaining the cycle performances at substantially the same level as those in comparative example 1.

A discharge controller according to one aspect of the present invention, wherein a nonaqueous-electrolyte secondary battery is provided as a power supply, is arranged so as to include the power supply, a load, and a controller, wherein the control section controls the cut-off voltage of discharge $V_E$ of the power supply based on a value obtained by dividing the amount of change in voltage $V_X$ by the measurement time t.

According to the foregoing discharge controller, the discharge can be stopped at a voltage directly before a voltage at which cycle deterioration of the positive and negative electrodes occur. It is therefore possible to realize excellent cyclic performance while ensuring a sufficient discharge capacity.

A discharge controller according to one aspect of the present invention includes a secondary battery, a switch section for opening and closing a discharge path from the secondary battery to a load, a voltage detector for detecting a terminal voltage of the secondary battery, and a cut-off voltage control section for controlling the switch section to be opened when the terminal voltage as detected by the voltage detector is at or below a predetermined cut-off voltage of discharge $V_E$, and while measuring an amount of decrease per unit time of the terminal voltage as detected by the voltage detector to set the cut-off voltage of discharge $V_E$ to a lower voltage, for a larger amount of decrease per unit time of the terminal voltage as detected by the voltage detector.

According to the foregoing structure, the discharge of the secondary battery is stopped when the terminal voltage of the secondary battery is reduced to not more than the cut-off voltage of discharge $V_E$. Moreover, when the cut-off voltage of discharge $V_E$ is set by the cut-off voltage control section such that the large is the amount of decrease per unit time, the lower is the cut-off voltage of discharge $V_E$. With this structure, in the case where respective polarizations of the positive and negative electrodes increase as a result of discharging the secondary battery with a large current, an amount of decrease per unit time increases. As a result, the cut-off voltage control section reduces the cut-off voltage of discharge $V_E$ corresponding to an increase in polarizations of the positive and negative polarities. It is therefore possible to improve the utilization efficiency of energy as stored by reducing the cut-off voltage of discharge $V_E$ while suppressing the cycle deterioration of the secondary battery.

In the case where the polarizations of positive and negative electrodes are reduced as a result of discharging the secondary battery with a low current, an amount of decrease in voltage per unit time is reduced. As a result, the cut-off voltage control section increases the cut-off voltage of discharge $V_E$ corresponding to a decrease in polarizations of the positive and negative polarities. It is therefore possible to suppress the deterioration of the secondary battery by terminating the discharge before the deterioration in the cycle performance occurs without being affected by an increase in voltage resulting from the deterioration in cycle performances caused by a decrease in polarizations of the positive and negative polarities.

Furthermore, the polarization of the positive and negative electrodes may vary according to environmental temperatures. However, even if the variations in polarization occur, by assuming the polarization of the positive and negative electrodes based on an amount of decrease per unit time of the terminal voltage of the secondary battery, it is possible to set the cut-off voltage of discharge $V_E$ reflecting the changes in polarization of the positive and negative polarities according to changes in environmental temperature. As a result, the problem associated with the conventional structure wherein the cut-off voltage of discharge $V_E$ is set based on a discharge current value is less likely to occur, i.e., an appropriate cut-off voltage of discharge cannot be obtained according to an environmental temperature.

It is preferable that the cut-off voltage control section measures the amount of decrease in the terminal voltage as an amount of change in voltage $V_X$ in a predetermined measurement time t, and uses a value obtained by dividing the amount of change in voltage $V_X$ by the measurement time t as the amount of decrease per unit time of the terminal voltage.

According to the foregoing structure, it is possible to measure a reduced amount of the terminal voltage with ease.

It is preferable to adopt a nonaqueous-electrolyte secondary battery as the secondary battery.

By adopting the nonaqueous-electrolyte secondary battery as the secondary battery, an amount of decrease in the terminal voltage with respect to an amount of discharge is large. It is therefore possible to measure an amount of decrease per unit time of the terminal voltage. For this reason, it is preferable to adopt the nonaqueous-electrolyte secondary battery as the secondary battery.

It is preferable that the cut-off voltage control section set the cut-off voltage of discharge $V_E$ from the following expression (1).

$$V_E = \beta - \alpha \times (V_x/t)^2 \qquad (1)$$

In this expression (1), α fails in a range of: $5 \leq \alpha \leq 25$, and β falls in a range of $1.5 \leq \beta \leq 3.0$.

The inventors of the present invention experimentally found that by setting the cut-off voltage of the discharge $V_E$ based on the above expression (1), it is possible to reduce a cut-off voltage of discharge while suppressing cycle deterioration of the secondary battery with ease.

It is preferable that the secondary battery is made up of assembled cells wherein plurality of cells are connected in series; and the cut-off voltage control section sets the cut-off voltage of discharge $V_E$ from the following expression (2):

$$V_E = \{\beta - \alpha \times (V_X/t)^2\} \times X \qquad (2)$$

In this expression (2), X indicates a number of cells connected in series, α fails in a range of: $5 \leq \alpha \leq 25$, and β falls in a range of $1.5 \leq \beta \leq 3.0$.

The inventors of the present invention experimentally found that by setting the cut-off voltage of the discharge $V_E$ based on the above expression (2), it is possible to reduce a cut-off voltage of discharge while suppressing cycle deterioration of the secondary battery with ease.

It is preferable be arranged such that the cut-off voltage control section measures the amount of decrease per unit time of the terminal voltage when the terminal voltage as detected by the voltage detector falls in a range not higher than 3.0 V and not less than 2.0 V per unit cell of the secondary battery, and not more than a predetermined threshold voltage.

As for the lithium-ion battery, the amount of decrease in the terminal voltage resulting from the discharge is small in the area where the terminal voltage exceeds 3.0 V. In response, by measuring an amount of decrease per unit time of the terminal voltage n the area where the terminal voltage exceeds 3.0 V, it is possible to measure the amount of decrease per unit time with improved precision.

On the other hand, in the area where the terminal voltage for each series cell of the secondary battery is below 2.0 V, the terminal voltage drastically drops resulting from the discharge. For this reason, when the amount of change in voltage $V_X$ is detected in the area where the terminal voltage for each series cell of secondary battery is below 2.0 V, the amount of change in voltage $V_X$ as detected would be too large. As a result, immediately after detecting the amount of change in voltage $V_X$, the cell voltage would reach the potential at which the material starts deteriorating. In response, by arranging so as to measure the amount of decrease per unit time in an area where the terminal voltage is not less than 2.0 V, it is possible to prevent such problem that the cell battery reaches a potential at which the respective materials deteriorate.

Incidentally, it is preferable that the secondary battery be regulated with a positive electrode capacity such that the discharge ends by the decrease in potential of the positive electrode at the end of discharge.

It is generally difficult to detect changes in voltage for a battery regulated with a negative electrode capacity, and therefore, those regulated with a positive electrode capacity are preferable for the secondary battery.

INDUSTRIAL APPLICABILITY

The discharge method and the discharge controller of the present invention is suitably applied for a heavy load equipment, an electric vehicle or other transport aircraft machines which require large capacity and long life.

What is claimed is:

1. A discharge controller comprising:
a secondary battery;
a switch section for opening/closing a discharge path from said secondary battery to a load;
a voltage detector for detecting a terminal voltage of said secondary battery; and
a cut-off voltage control section for controlling the switch section to be opened when the terminal voltage as detected by the voltage detector is not more than a predetermined cut-off voltage of discharge $V_E$, while measuring an amount of decrease per unit time of the terminal voltage as detected by said voltage detector to set the cut-off voltage of discharge $V_E$ to a lower voltage, for a larger amount of decrease per unit time of the terminal voltage as detected by said voltage detector.

2. The discharge controller according to claim 1, wherein:
said cut-off voltage control section measures the amount of decrease in the terminal voltage as an amount of change in voltage Vx in a predetermined measurement time t, and uses a value obtained by dividing the amount of change in voltage Vx by the measurement time t as the amount of decrease per unit time of the terminal voltage.

3. The discharge controller according to claim 2, wherein:
said secondary battery is a nonaqueous-electrolyte secondary battery.

4. The discharge controller according to claim 3, wherein:
said cut-off voltage control section sets the cut-off voltage of discharge $V_E$ from the following expression (1):

$$V_E = \beta - \alpha \times (V_x/t)^2 \qquad (1)$$

in the expression (1), $\alpha$ falls in a range of $:5 \leq \alpha \leq 25$, and $\beta$ falls in a range of $1.5 \leq \beta \leq 3.0$.

5. The discharge controller according to claim 3, wherein:
said secondary battery is made up of assembled cells wherein plurality of cells are connected in series; and
said cut-off voltage control section sets the cut-off voltage of discharge $V_E$ from the following expression (2):

$$V_E = \{\beta - \alpha \times (V_x/t)^2\} \times X \qquad (2)$$

in the expression (2), X indicates a number of cells connected in series, $\alpha$ falls in a range of $:5 \leq \alpha \leq 25$, and $\beta$ falls in a range of $1.5 \leq \beta \leq 3.0$.

6. The discharge controller according to claim 1, wherein:
said cut-off voltage control section measures the amount of decrease per unit time of the terminal voltage when the terminal voltage as detected by said voltage detector falls in a range not higher than 3.0 V and not less than 2.0 V per unit cell of the secondary battery, and not more than a predetermined threshold voltage.

7. The discharge controller according to claim 1, wherein:
said secondary battery is regulated with a positive electrode capacity such that the discharge ends by the decrease in potential of the positive electrode at the end of discharge.

* * * * *